Figure 1:
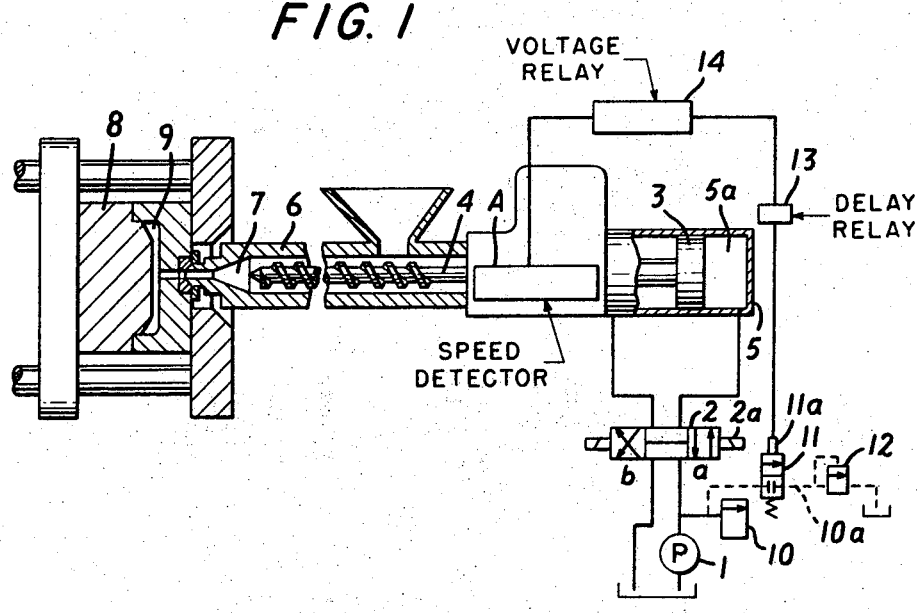

United States Patent

[11] 3,632,246

[72] Inventors Shigeo Ichikawa;
 Keizo Nagawa, both of Aichi-ken, Japan
[21] Appl. No. 861,903
[22] Filed Sept. 29, 1969
[45] Patented Jan. 4, 1972
[73] Assignee Kabushiki Kaisha Meikiseisakusho
 Nagoya-shi, Aichi-ken, Japan
[32] Priorities Oct. 1, 1968
[33] Japan
[31] 43/71,264;
 Oct. 1, 1968, Japan, No. 43/71,265

[54] INJECTION MOLDING APPARATUS
 6 Claims, 5 Drawing Figs.
[52] U.S. Cl. .................................................. 425/135,
 425/149, 425/207
[51] Int. Cl. .................................................. B29f 1/04
[50] Field of Search ........................................... 18/30 CR,
 30 CM, 30 CS, 30 CV, 30 SS, 30 SR, 12 SM, 12 A;
 264/40, 328, 329

[56] References Cited
UNITED STATES PATENTS
2,926,386 3/1960 Hutchinson .................. 264/328 X
3,359,601 12/1967 Evans .......................... 18/30 SS
3,371,386 3/1968 Ludwig ......................... 18/30 CR Primary Examiner—J. Spencer Overholser
Assistant Examiner—Norman E. Lehrer
Attorney—John B. Armentrout ABSTRACT: A molding extruder having a pressure-relieving device which will relieve relatively high pressure to a lower holding pressure within the extruder on a delay after fluid molding material has been fully injected into the cavity of a mold and in which the time of completion of injection into the mold cavity is determined by an inherent reduction of feed speed of the extruder plunger.

INJECTION MOLDING APPARATUS

The present invention relates to a molding extruder, more particularly to a molding extruder having a pressure relieving device for reducing a pressure within the extruder when a fluent molding substance has filled a mold cavity by injection.

It is conventional to arrest the occurrence of shrinkage of injection molded products by applying pressure to the product in an injection mold for a period of time such as until solidification of a gate portion of the product occurs. However, it is not desirable in terms of quality of finished products nor from the standpoint of economical power consumption to maintain pressure for the latter purpose as high within an extruder cylinder of the injection press or to operate a hydraulic pump during the shrinkage arrestation interval at the relatively high pressures used for injection. Therefore, it is usual practice to maintain the pressure within the extruder cylinder at a low value sufficient to keep the plastic resin in a slightly pressurized condition after a substantial completion of the injection of plastic resin into the cavity such as with switching on a pump having small delivery characteristics or through use of large delivery pump substantially unloaded. In order to effect change-over in pressure, limit switches heretofore have been used actuated as the injection plunger has been advanced to a predetermined position or pressure change-over has been effected based upon the elapse of a predetermined period of time extending from initiation of the injection plunger movement for filling the mold.

Since the above-mentioned means are not constructed so as to detect the completion of a injection of plastic resin into the cavity of a mold, thereby permitting the injection pressure to be relieved, any high injection pressure preset to a value for being relieved may, for example, be maintained for an unduly prolonged period of time even after the plastic resin has completely filled the cavity of the mold, thus in the latter instance resulting in a high residual stress within the finished product. Also, means have been provided within the cavity of a mold for detecting a rise in pressure at the time when the mold cavity becomes full, but placement accordingly mars the mold face and leads to a scar in the surface of the molded product. Also, since the detecting means under these conditions has been provided through production of the mold, installation has been complicated.

In addition, as a simple means, a pressure switch has been used for detecting the pressure within the extruder cylinder and thereby relieving the extruding pressure. However, a pressure switch oftentimes has proved to be inadequate, for detecting the instant when the molten plastic resin has filled the mold cavity, for such reasons as being prone to any one or more such deficiencies as inability to maintain a predetermined pressure response characteristic, frequent introduction of malfunctions, and poor followup to a change in pressure.

An object of the present invention is to provide improvements in detecting the completion of injection of a fluent molding material into a mold cavity and in relieving the injecting pressure.

In certain practices in accordance with the present invention, it is observed that a resin plasticized, for example by means of a screw plunger within a heating cylinder of a molding extruder, and injected into the cavity of a metallic mold as by the advancement of the screw plunger, starts to cool down in the mold and thus encounters an increase in resistance to flow. Moreover, the pressure within the extruder cylinder will start to increase. When the screw plunger is further urged in the forward direction after the plastic resin has filled the mold cavity, the pressure within the cavity, which was attributable to resistance to flow, will now tend to compress the plastic resin, thereby producing a sudden rise in pressure. That is, the pressure within the cavity, which was caused on flow until then, will increase to a static pressure.

The pressure within the cylinder of the extruder will be raised as that of the plastic resin increases, about the time when the pressure within the mold cavity is converted from pressure due to flow to static pressure. Meanwhile, the delivery rate of oil, from a pump, energizing the screw plunger rectilinearly, will decrease as speed of advancement of the screw plunger is reduced.

Another object of the present invention is to provide in an injection molding apparatus a device for detecting the retardation or reduction in speed of advancement of a plunger as the plunger injects fluent molding material into a mold and causes the mold cavity to become full, and incorporating means for transmitting a signal from the detecting device representing that the mold is full and reducing pressure energizing the plunger to a lower pressure in response to the signal after a delay, thereby maintaining relatively high pressure in the mold to assure that the mold is full and thereafter exerting a lower pressure.

In accordance with the present invention, there is provided a molding extruder comprising, a plunger for feeding molten plastic resin into the cavity of a metallic mold and detector means for detecting a retardation of the feed speed of the plunger, the retardation of feed speed of the plunger being incidental to substantially the completion of injection of the plastic resin into the cavity, a change-over valve for relieving pressure in the mold to a smaller value, means for transmitting a signal to actuate the change-over valve when a detected retardation in speed as appraised by the detector means reaches a predetermined value, and relay means for delaying the arrival of the signal at the change-over valve.

Figure 2:
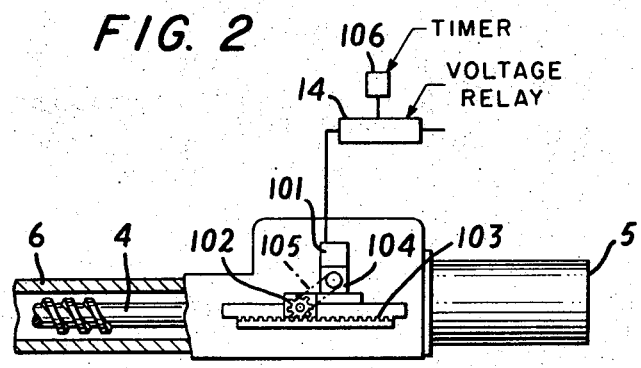
Figure 3:
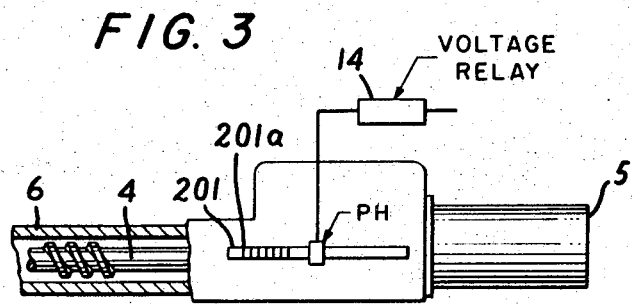
Figure 4:
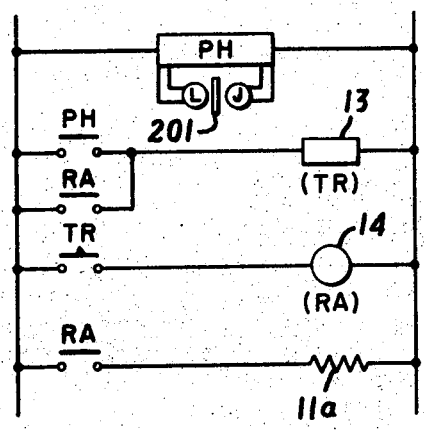
Figure 5:
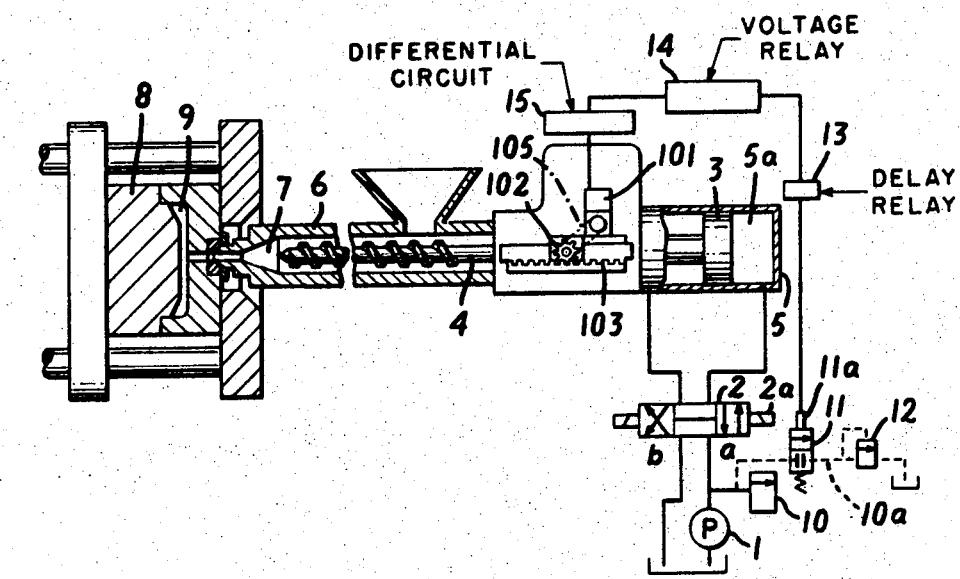

Preferred embodiments according to the present invention will be described in detail by way of example with reference to the accompanying drawings, in which FIG. 1 is a schematic view partly in section showing one embodiment according to the present invention, FIGS. 2 and 3 are side elevation views in enlarged scale showing two different embodiments of the speed detecting means for the screw plunger, FIG. 4 is a wiring diagram showing connections of wirings used in FIG. 3, and FIG. 5 is a schematic view partly in section representing a further embodiment herein.

Referring now more particularly to FIG. 1, a suitably heated cylinder 6 of an extruder is shown having a screw plunger 4 fitted therein and connected to a metallic mold 8 with a front chamber 7 thereof in communication with a cavity 9 of the metallic mold 8. The plunger 4 includes a piston 3 at one end portion opposite to that having a screw thread. The piston 3 is reciprocatively fitted into a cylinder 5 located at one of the heated cylinder 6. An oil pump 1 is connected to cylinder 5 through a four-way valve 2 so as to supply oil to either side of the piston 3 selectively. A relief valve 10 is connected to the delivery line of the pump 1. A secondary relief valve 12 is connected to the drain line 10a which is branched off from the delivery line of the pump 1. The secondary relief valve 12 is usually set at a pressure lower than the set pressure of the relief valve 10. A speed sensing means designated A is mounted on the cylinder 5 so as to detect a change in speed of the screw plunger 4 and then transmit a signal to a solenoid 11a of two-way valve 11 via a voltage relay 14 and a delay relay 13. The above-mentioned drain line 10a from the delivery of the plump 1, as shown in FIG. 1, is led to pass connecting the two-way valve 11 and the secondary relief valve 12 in series and is tapped into the secondary relief valve for the latter to be responsive to the drain line pressure at the aforementioned set pressure.

When the pump as shown in FIG. 1 is actuated, with the four-way valve 2 meanwhile being placed in communication, through side designated a, so as to supply working oil from the pump to chamber 5a of the cylinder 5, thereby displacing the piston 3 and hence the screw plunger 4 forwardly or to the left, the resin which is already plasticized and collected in the chamber in front of the screw plunger 4 in the heated cylinder 6 will start to flow into the cavity 9 of the metallic mold. As plunger 4 is advanced farther, the plastic resin will eventually completely fill the cavity.

As described hereinabove, the speed of the screw plunger will be conspicuously retarded or reduced about the time when the pressure of the plastic resin within the cavity is converted from pressure under flow to static pressure. Accordingly, a determination of the instant when the cavity is substantially full of molten plastic resin is had by detecting the reduction in feed speed of the screw plunger.

In one embodiment according to the present invention, the speed is detected by the speed-sensing means A which will transform the speed into a voltage signal. When the signal transmitted from the speed sensing means A reaches a value preset at the voltage relay 14, the solenoid 11a of the two-way valve 11 will be actuated through the delay relay 13. Then, the drain line 10a from the delivery side of the pump 1 will be communicated to the secondary relief valve 12 through the two-way valve 11, thereby relieving the pressure introduced in the cylinder 5 through valve 2 in the side a communicating position. The delay relay is designed to cause the operation of the two-way valve 11 to be delayed minutely by delaying the signal transmitted from the voltage relay 14.

Toward avoiding undue prolongation of relatively high pressure conditions in the mold before fluid energizing pressure on the screw plunger 4 can be alleviated to a holding pressure through opening of the two-way 11, a particular retardation in speed of the screw plunger as detected by the speed sensing means A and transmitted to the preset voltage relay 14 is determined to be appropriate for such an avoidance. Also, to assure feed of plastic into the mold in quantity adequate for filling the mold according to the corresponding detected retardation in speed of the screw plunger, a sufficiently accelerated speed of driving the screw plunger is arrived at and reliance for minute additional supply assurance is placed upon use of the delay relay 13.

As a result of delay of the time of relieving the extruding or injecting pressure under the dictates of the delay relay 13, the pressure within the extruder cylinder on operation of the pump 1 will be raised dependently upon the period of time during which relief is delayed. If need be, feed of a small amount of the plastic resin under this pressure rise of short duration will occur into the mold cavity to compensate for insufficient feed. If a delay relay which is adjustable in terms of a preset time is used, it will be possible to assure minute adjustment.

Now, with reference to FIG. 2, a stationary rack 103 is fixedly mounted on a frame of the molding extruder. A pinion 102, which is meshed with the rack 103, is provided connected so as to move in unison with the screw plunger 4 in a rectilinear direction without rotating with the screw plunger. A tachometer also is provided so as to reciprocate together with the screw plunger. The rack 103 and pinion 102 will indicate the linear motion of the screw plunger 4 in number of revolutions. The revolution of the pinion 102 is transmitted to an amplifying gear 104, which in turn is connected with the tachometer 101, by means of a belt 105. A timer 106 is connected so as to inhibit operation of the voltage relay 14 on control of the tachometer output until after the speed of the screw plunger 4 attains a predetermined value during initial rectilinear in stroke advance of the screw plunger. When the output of the tachometer 101 later in stroke of the screw plunger 4 becomes smaller than the value preset at the voltage relay 14, the latter will work to relieve the injecting pressure by energizing the solenoid 11a of the two-way valve 11.

With reference to FIGS. 3 and 4, a photoelectric switch PH is provided so as to move in unison with the screw plunger 4. A slit plate 201, which is fixedly mounted on the frame of the molding extruder, is located between a light source L and a receiver element J of the photoelectric switch PH, see FIG. 4. As shown in FIG. 3 slits 201a are provided at uniform spacing on the slit plate 201 only in the leftside half thereof.

Now, the screw plunger 4 will be accelerated when it is advanced to start extrusion. However, in the interests of inhibiting both operation of the photoelectric switch PH and operation of the voltage relay 14 early in stroke of the screw plunger 4, no slits are provided on the slit plate in the rightside half thereof. As the photoelectric switch PH advances from each slit portion 201a of the slit plate 201 encountered to the next, with advance of the screw plunger 4, the light beam emanated from the light source L of the photoelectric switch PH is interrupted by an intermediate portion of the plate 201. The receiver element J, as controlled by the light beam, has a predetermined speed response making it possible to have the photoelectric switch not operate when the speed of the screw plunger is greater than the response speed of the receiver element J. When the pressure of the plastic resin in the cavity is raised and the speed of advance of the screw plunger is retarded to the response speed of the receiver element J of the photoelectric switch PH, contacts RA of the voltage relay 14 will be self-retained and the voltage relay will operate, after an elapsed period of time preset by the delay relay 13, to energize the solenoid 11a of the two-way valve 11 to relieve the extruding pressure.

FIG. 5 shows another embodiment according to the present invention. A rack 103 fixedly mounted on the frame of the molding extruder and a pinion 102 moving in unison with the screw plunger 4 are used to convert the linear movement of the plunger into rotation of the pinion. A belt is entrained over the pinion 102 and imparts an accelerated rotation to a tachometer 101 which will transmit a signal dependent upon revolutions received. Output of the tachometer 101 is introduced into a differential circuit 15 which will transmit a signal representing the speed of the screw plunger 4. When the signal transmitted from the differential circuit 15 reaches a value preset by the voltage relay 14, electric current will flow through the delay relay 13 to energize the solenoid 11a of the two-way valve 11, thereby connecting the drain line 10a from the delivery side of pump 1 with the secondary relief valve 12 to relieve the extruding pressure in the cylinder 5.

A few embodiments according to the present invention have been described hereinabove. It is evident that the extruder means need not be restricted to the screw plunger type and that the present invention may readily be practiced through use of an extruder of so-called plunger type.

It further will be seen that in accordance with the practice of the present invention, the time when plastic resin has filled the cavity of the mold is determined accurately by means as described in detail hereinabove, and that relatively high pressure on the plastic resin in the mold cavity is not unduly prolonged, thereby giving a molded product of good quality having a minimum amount of residual stress.

Since in essence the pressure of plastic referred to herein is detected in the mold cavity, products comprising the molded plastic resin from the mold tend toward being of constant density and hence constant weight. Also, since the advancement of the screw or plunger is stopped whenever the mold cavity is full, the stroke of the screw or plunger is automatically prescribed. Again, since the advance of the screw or plunger will be stopped whenever the mold cavity is full, it becomes possible to carry out injection regardless of tolerable variations in the amount of resin injected.

As many possible embodiments of the invention may be made and as many possible changes may be made in the embodiments hereinbefore set forth, it will be understood that all matter described herein is to be interpreter as illustrative and not as a limitation.

We claim:

1. In injection molding apparatus, the combination which includes, a plunger, speed sensing means for producing a signal representing a predetermined rectilinear feed speed retardation of said plunger coincident with the substantial completion of filling a mold cavity with fluent molding material on operation of said plunger, pressure relief valve means including a valve responsive to said signal for relieving pressure of fluid urging said plunger rectilinearly toward feeding fluent molding material into a mold cavity after responding to said signal, and signal transmitting means communicating with said speed sensing means and with said signal-responsive valve and including delay means for delaying response of said signal-responsive valve to said signal for a brief interval of time following the initiation of said signal.

2. In injection molding apparatus, the combination as set forth in claim 1 characterized by said plunger carrying a first portion of said speed sensing means for moving said first portion rectilinearly in unison therewith, and a second portion of said speed sensing means being disposed in a related fixed position so that said first portion and said plunger move in unison rectilinearly past said second portion, one of said portions including a photoelectric switch and the other of said portions including a slit plate.

3. In injection molding apparatus, the combination as set forth in claim 1 wherein signal-inhibiting means in the apparatus inhibits signal output by said speed sensing means during initial rectilinear in stroke advance of said plunger toward feeding fluent molding material into a mold cavity.

4. In injection molding apparatus, the combination as set forth in claim 17 wherein said speed sensing means includes tachometer means for transforming said rectilinear movement of said plunger into revolutions representing rectilinear speed.

5. In injection molding apparatus, the combination as set forth in claim 17 wherein said delay means for delaying response of said signal-responsive valve to said signal includes delay relay means, and a voltage relay is interconnected with said speed sensing means and said delay relay means for transmitting a signal energizing said delay relay means when output of said speed-sensing means reaches a predetermined magnitude.

6. In injection molding apparatus, the combination which includes, a plunger, speed sensing means for producing a signal representing a predetermined rectilinear feed speed retardation of said plunger coincident with the substantial completion of filling a mold cavity with fluent molding material on operation of said plunger, pressure relief valve means including a signal-responsive valve and pressure-responsive valve for relieving pressure of fluid urging said plunger rectilinearly toward feeding fluent molding material into a mold cavity down to a lower pressure level in response to pressure of said fluid after said signal-responsive valve responds to said signal, and signal transmitting means communicating with said speed sensing means and with said signal-responsive valve and including delay means for delaying response of said signal-responsive valve to said signal for a brief interval of time following the initiation of said signal.

* * * * *